US010353248B2

(12) United States Patent
Shinohara et al.

(10) Patent No.: US 10,353,248 B2
(45) Date of Patent: *Jul. 16, 2019

(54) ELECTRO-OPTICAL DEVICE AND ELECTRONIC APPARATUS

(71) Applicant: Seiko Epson Corporation, Tokyo (JP)

(72) Inventors: Takashi Shinohara, Chino (JP); Yuichi Shimizu, Hokuto (JP); Shigeki Kobayashi, Chino (JP); Takuya Miyakawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 33 days.

This patent is subject to a terminal disclaimer.

(21) Appl. No.: 15/968,125

(22) Filed: May 1, 2018

(65) Prior Publication Data

US 2018/0246357 A1    Aug. 30, 2018

Related U.S. Application Data

(63) Continuation of application No. 15/269,927, filed on Sep. 19, 2016, now Pat. No. 9,989,810, which is a
(Continued)

(30) Foreign Application Priority Data

Jul. 2, 2014   (JP) .................................. 2014-136539

(51) Int. Cl.
*G02F 1/1339* (2006.01)
*G02F 1/1333* (2006.01)

(52) U.S. Cl.
CPC ..................... *G02F 1/1339* (2013.01); *G02F 2001/133311* (2013.01); *G02F 2201/501* (2013.01)

(58) Field of Classification Search
CPC .................................................. G02F 1/1339
See application file for complete search history.

(56) References Cited

U.S. PATENT DOCUMENTS 5,016,987 A   5/1991 Smith, Jr.
5,406,399 A   4/1995 Koike
(Continued)

FOREIGN PATENT DOCUMENTS

JP   10-232404 A    9/1998
JP   2001-318384 A   11/2001
(Continued)

OTHER PUBLICATIONS

Notice of Allowance and Notice of Allowability received in U.S. Appl. No. 14/753,154, dated Jun. 22, 2016.
(Continued)

*Primary Examiner* — James A Dudek
(74) *Attorney, Agent, or Firm* — ALG Intellectual Property, LLC

(57) ABSTRACT

An electro-optical device includes a first substrate, a second substrate, an adhesive agent between the first and second substrates, and an inorganic film. The adhesive agent has a first face stuck to the first substrate, a second face stuck to the second substrate, and a third face between the first and second faces. The inorganic film covers the third face on one side of the electro-optical device, a region of the first substrate between the first face and a side of the first substrate on the one side, and a region of the second substrate between the second face and a side of the second substrate on the one side. A distance between the first substrate and the second substrate is less than a distance between the first face and the side of the first substrate, and a distance between the second face and the side of the second substrate.

16 Claims, 6 Drawing Sheets

Related U.S. Application Data continuation of application No. 14/753,154, filed on Jun. 29, 2015, now Pat. No. 9,470,932.

(56) References Cited

U.S. PATENT DOCUMENTS

| | | | |
|---|---|---|---|
| 5,610,742 | A | 3/1997 | Hinata et al. |
| 5,835,179 | A | 11/1998 | Yamanaka |
| 6,219,127 | B1 | 4/2001 | Hirakata et al. |
| 6,661,490 | B2 | 12/2003 | Tanaka |
| 7,189,999 | B2 | 3/2007 | Yamazaki et al. |
| 9,470,932 | B2 * | 10/2016 | Shinohara ............. G02F 1/1339 |
| 9,989,810 | B2 * | 6/2018 | Shinohara ............. G02F 1/1339 |
| 2002/0106451 | A1 | 8/2002 | Skarp et al. |
| 2004/0192036 | A1 | 9/2004 | Koyanagi et al. |
| 2007/0205452 | A1 | 9/2007 | Koyanagi et al. |
| 2009/0147205 | A1 | 6/2009 | Mizuno et al. |
| 2012/0307193 | A1 | 12/2012 | Jylha et al. |

FOREIGN PATENT DOCUMENTS

| | | |
|---|---|---|
| JP | 2004-296814 A | 10/2004 |
| JP | 2006-165537 A | 6/2006 |
| JP | 2007-047253 A | 2/2007 |
| JP | 2007-219364 A | 8/2007 |
| JP | 2008-225399 A | 9/2008 |
| JP | 2009-145403 A | 7/2009 |
| JP | 2010-026307 A | 2/2010 |

OTHER PUBLICATIONS

Non-Final Office Action received in U.S. Appl. No. 15/269,927, dated Aug. 28, 2017.

Notice of Allowance and Notice of Allowability received in U.S. Appl. No. 15/269,927, dated Feb. 2, 2018.

* cited by examiner

FIG. 4A
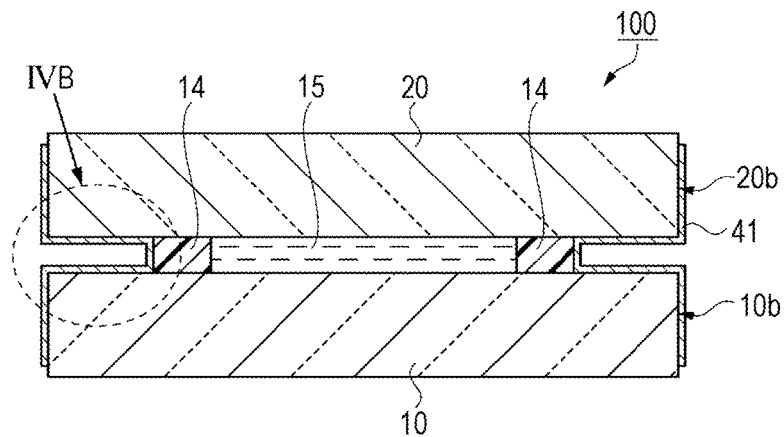
FIG. 4B
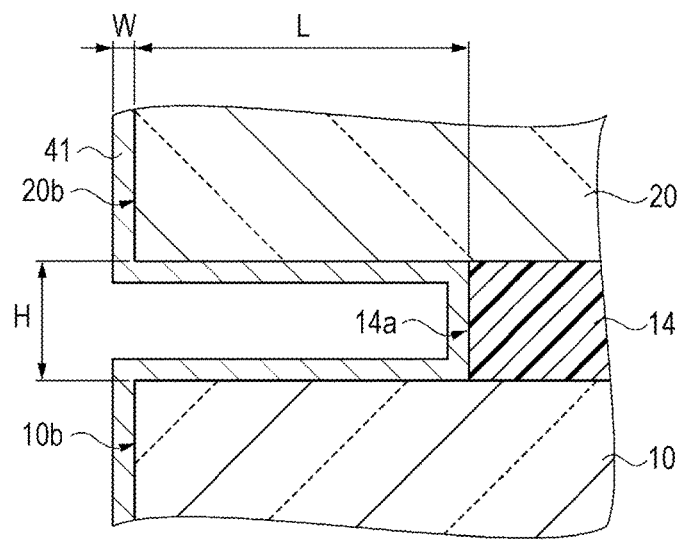
FIG. 5
| ASPECT RATIO | 1 | 10 | 50 | 150 | 300 | 500 | 600 |
|---|---|---|---|---|---|---|---|
| NUMBER OF OCCURRENCE OF FAILURES AFTER MOISTURE RESISTANCE TEST | 4/5 | 3/5 | 0/5 | 0/5 | 0/5 | 4/5 | 5/5 |

ELECTRO-OPTICAL DEVICE AND ELECTRONIC APPARATUS

The present application is a continuation application of U.S. patent application Ser. No. 15/269,927 filed on Sep. 19, 2016, which is a continuation application of U.S. patent application Ser. No. 14/753,154 filed on Jun. 29, 2015 (now U.S. Pat. No. 9,470,932), which claims priority from Japanese Patent Application No. 2014-136539 filed Jul. 2, 2014, each of which are expressly incorporated by reference herein.

BACKGROUND

1. Technical Field

The present invention relates to an electro-optical device and an electronic apparatus.

2. Related Art

As one of the electro-optical device described above, for example, an active driving system liquid crystal device including a transistor as an element switch-controlling a pixel electrode for each pixel is known. The liquid crystal device is used, for example, for a light valve of a direct viewing type display, a projector, or the like.

The liquid crystal device includes, for example, an element substrate, a counter substrate arranged so as to face the element substrate, and a liquid crystal layer pinched between the element substrate and the counter substrate through a seal material. In order to suppress water intrusion into the liquid crystal layer through the seal material between the element substrate and the counter substrate, for example, a barrier layer or a moisture-proof film consisting of an inorganic material is formed over side faces of the seal material, the counter substrate, and the element substrate as described in JP-A-2008-225399 and JP-A-2007-47253.

However, since the distance from each of a side face of the element substrate and a side face of the counter substrate to the seal material is longer than the length of an interval between the element substrate and the counter substrate, there is a problem in which the barrier layer is not formed up to the seal material. Therefore, for example, as shown in FIG. 9, a base film 501 consisting of a resin material or the like is formed over a side face 14a of a seal material 14, a side face 20b of a counter substrate 20, and a side face 10b of an element substrate 10, furthermore, a barrier film 502 is formed so as to cover the base film 501.

However, there is an issue in which, since the base film 501 and the barrier film 502 considerably protrude from a side face of a liquid crystal device 500 (the side face 10b of the element substrate 10 and the side face 20b of the counter substrate 20), when a physical impact is applied, the barrier film 502 is destroyed by an occurrence of cracking or chipping, and thus the moisture resistance deteriorates.

SUMMARY

The invention can be realized in the following forms or application examples.

Application Example 1

According to this application example, there is provided an electro-optical device including an element substrate, a counter substrate arranged so as to face the element substrate through a seal material, and an inorganic film provided so as to cover a side face of the seal material, at least a part of a side face of the element substrate, and at least a part of a side face of the counter substrate, in which the element substrate and the seal material are arranged so that a ratio of a length between the side face of the element substrate and the side face of the seal material to a length of an interval between the element substrate and the counter substrate is from 50 to 300, and the counter substrate and the seal material are arranged so that a ratio of a length between the side face of the counter substrate and the side face of the seal material to a length of an interval between the element substrate and the counter substrate is from 50 to 300.

In this case, since the element substrate, the counter substrate, and the seal material are arranged so that the ratio of the length described above (the aspect ratio) becomes from 50 to 300, it is possible to form the inorganic film over the seal material and the side face of each substrate. Therefore, it is possible to directly form the inorganic film on the surfaces of each substrate and the seal material without providing a resin material on a base of the inorganic film unlike in the related art. Therefore, it becomes possible to prevent the inorganic film from considerably protruding from the side face of each substrate and an impact is hardly applied to the inorganic film. In addition, since the side face of the seal material and the side face of each substrate are covered with the inorganic film, it is possible to prevent water from intruding into an area surrounded by the seal material, and thus it is possible to enhance the moisture resistance.

Application Example 2

In the electro-optical device according to the application example, it is preferable that a length of an interval between the element substrate and the counter substrate is from 1 μm to 5 μm and a length between the side face of the element substrate and the side face of the seal material is from 1 μm to 1,000 μm, and a length between the side face of the counter substrate and the side face of the seal material is from 1 μm to 1,000 μm.

In this case, by arranging the element substrate, the counter substrate, and the seal material so as to achieve the value described above, it is possible to neatly form the inorganic film over the side face of the seal material and the side face of each substrate. Therefore, it is possible to enhance the moisture resistance.

Application Example 3

In the electro-optical device according to the application example, it is preferable that a length of an interval between the element substrate and the counter substrate is from 2 μm to 3 μm and a length between the side face of the element substrate and the side face of the seal material is from 1 μm to 1,000 μm, and a length between the side face of the counter substrate and the side face of the seal material is from 100 μm to 700 μm.

In this case, by arranging the element substrate, the counter substrate, and the seal material so as to achieve the value described above, it is possible to form the inorganic film having high quality over the side face of seal material and the side face of each substrate. Therefore, it is possible to enhance the moisture resistance.

Application Example 4

In the electro-optical device according to the application example, it is preferable that the inorganic film is a film formed by an ALD technique.

In this case, since the inorganic film is formed by an ALD, it is possible to form the inorganic film even in a gap having relatively large aspect ratio. Therefore, it is possible to directly form the inorganic film on the side face of each substrate or the seal material without arranging the resin material on the base of the inorganic material unlike in the related art.

Application Example 5

In the electro-optical device according to the application example, it is preferable that the inorganic film is formed of tantalum oxide.

In this case, since the tantalum oxide film is formed over the side face of the seal material and the side face of the substrate, it is possible to prevent water from intruding into an area surrounded by the seal material.

Application Example 6

In the electro-optical device according to the application example, it is preferable that a thickness of the inorganic film is from 1 nm to 50 nm.

In this case, by setting to a film thickness as described above, it is possible to make the inorganic film strong against an impact and enhance the moisture resistance.

Application Example 7

According to this application example, there is provided an electronic apparatus including the electro-optical device described above.

In this case, since the electronic apparatus includes the electro-optical device as described above, it is possible to provide an electronic apparatus capable of enhancing a display quality.

BRIEF DESCRIPTION OF THE DRAWINGS

The invention will be described with reference to the accompanying drawings, wherein like numbers reference like elements.

FIGS. 4A and 4B are schematic cross-section views illustrating a configuration of a barrier film provided in the liquid crystal device.

FIG. 5 is a chart illustrating a relationship between an aspect ratio and a quantity of an occurrence of failures.

DESCRIPTION OF EXEMPLARY EMBODIMENTS

Hereinafter, an embodiment of the invention will be described with reference to the drawings. Meanwhile, the drawings which are used are displayed by being appropriately enlarged or reduced so that a part corresponding to the description becomes recognizable.

Meanwhile, in the following descriptions, for example, "on a substrate" represents a case of being arranged so as to have contact with a substrate, a case of being arranged on a substrate through other components, or a case of being partially arranged so as to have contact with a substrate and being partially arranged on a substrate through other components.

In the embodiment, description will be given by giving an active matrix type liquid crystal device including a thin film transistor (TFT) as a switching element of a pixel as an example of an electro-optical device. The liquid crystal device can be suitably used, for example, as an optical modulation element (a liquid crystal light valve) of a projection type display apparatus (a liquid crystal projector).

Configuration of Electro-Optical Device

Figure 1:
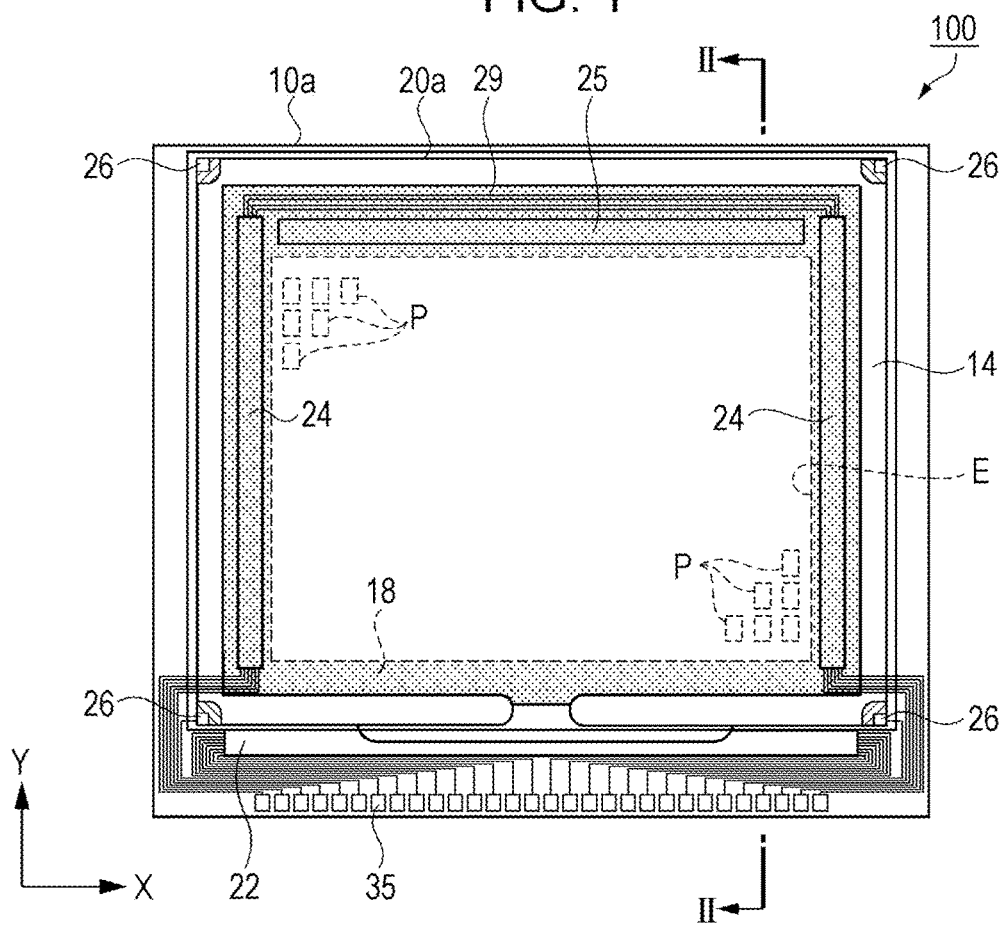
FIG. 1 is a schematic plane view illustrating a configuration of a liquid crystal device as an electro-optical device.
Figure 2:
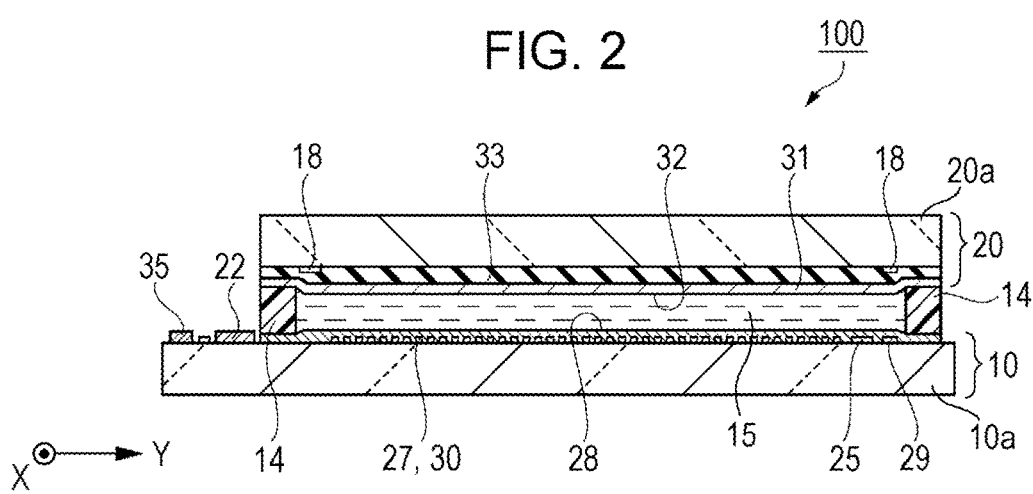
FIG. 2 is a schematic cross-section view taken along the line II-II of the liquid crystal device shown in FIG. 1.

FIG. 1 is a schematic plane view illustrating a configuration of a liquid crystal device as an electro-optical device. FIG. 2 is a schematic cross-section view taken along the line II-II of the liquid crystal device shown in FIG. 1. Hereinafter, a configuration of the liquid crystal device will be described with reference to FIG. 1 and FIG. 2.

As shown in FIG. 1 and FIG. 2, a liquid crystal device 100 in the embodiment has an element substrate 10 and a counter substrate 20 arranged so as to face each other and a liquid crystal layer 15 interposed by a pair of these substrates. For a first base material 10a configuring the element substrate 10, for example, a transparent substrate such as a glass substrate or a quartz substrate, or a silicon substrate is used, and for a second base material 20a configuring the counter substrate 20, for example, a transparent substrate such as a glass substrate or a quartz substrate is used.

The element substrate 10 is larger than the counter substrate 20 and both substrates 10 and 20 are joined through a seal material 14 arranged along an outer periphery of the counter substrate 20. The liquid crystal layer 15 is configured by filling an area between the element substrate 10 and the counter substrate 20 and inside the seal material 14 provided in an annular shape in plane view with a liquid crystal having a positive or negative dielectric anisotropy. For the seal material 14, for example, an adhesive agent such as a thermosetting or ultraviolet curing epoxy resin is employed. A spacer (omitted in the figure) for keeping an interval of a pair of substrates constant is mixed into the seal material 14.

A display region E in which a plurality of pixels P are arrayed, is provided at an inner side than an inner edge of the seal material 14. The display region E may include dummy pixels arranged so as to surround the plurality of pixels P, in addition to the plurality of pixels P which contribute to the display. In addition, while being omitted in FIG. 1 and FIG. 2, a light shielding film (black matrix: BM) which respectively planarly divides a plurality of pixels P in the display region E is provided on the counter substrate 20.

A data line driving circuit 22 is provided between the seal material 14 along one side part of the element substrate 10 and the one side part. In addition, an inspection circuit 25 is provided between the seal material 14 along another side part facing the one side part and the display region E. Furthermore, a scanning line driving circuit 24 is provided between the seal material 14 along two other side parts which are orthogonal with the one side part and face each other and the display region E. A plurality of wirings 29 connecting two scanning line driving circuits 24 are provided between the seal material 14 along the other side part facing the one side part and the inspection circuit 25.

A light shielding film 18 (a parting portion) is provided between the seal material 14 arranged in an annular shape in the counter substrate 20 and the display region E as a light shielding member. The light shielding film 18 consists of, for example, a light-shielding metal or metal oxide or the like and a portion inside the light shielding film 18 is the display region E having the plurality of pixels P. Meanwhile, while being omitted in FIG. 1, the light shielding film which planarly divides a plurality of pixels P in the display region E is also provided on the display region E.

The wiring connected to the data line driving circuit 22 and the scanning line driving circuit 24 is connected to a plurality of terminals for external connection 35 arrayed along the one side part. Hereinafter, description will be given by setting a direction along the one side part to an X direction and setting a direction along the two other side parts which are orthogonal with the one side part and face each other to a Y direction.

As shown in FIG. 2, a translucent pixel electrode 27 and a thin film transistor (TFT: hereinafter, referred to as a "TFT 30") which is a switching element provided for each pixel P, a signal wiring, and an inorganic alignment film 28 covering these are formed on the surface of the liquid crystal layer 15 side of the first base material 10a.

In addition, a light shielding structure which prevents a switching action from becoming unstable when light enters into a semiconductor layer in the TFT 30 is employed. The element substrate 10 in the invention includes at least the pixel electrode 27, the TFT 30, and the inorganic alignment film 28.

The light shielding film 18, an insulation film 33 which is formed so as to cover the light shielding film 18, a counter electrode 31 which is provided so as to cover the insulation film 33, and an inorganic alignment layer 32 which covers the counter electrode 31 are provided on the surface of the liquid crystal layer 15 side of the counter substrate 20. The counter substrate 20 in the invention includes at least the insulation film 33, the counter electrode 31, and the inorganic alignment layer 32.

As shown in FIG. 1, the light shielding film 18 surrounds the display region E and is provided to planarly overlap with the scanning line driving circuit 24 and the inspection circuit 25 (simply shown in the figure). Accordingly, the light shielding film 18 has a role of blocking light which enters into peripheral circuits including these driving circuits from the counter substrate 20 side and preventing malfunction of the peripheral circuits due to light. In addition, light is blocked so that unnecessary stray light does not enter into the display region E and high contrast is secured in the display in the display region E.

The insulation film 33 consists of, for example, an inorganic material such as a silicon oxide, has light transmission, and is provided so as to cover the light shielding film 18. In methods of forming such the insulation film 33, for example, a method in which a film is formed using a plasma chemical vapor deposition (CVD) method or the like, is included.

The counter electrode 31 consists of, for example, a transparent conductive film such as indium tin oxide (ITO), covers the insulation film 33, and is electrically connected to a wiring of the element substrate 10 side by a vertical conduction portion 26 provided at four corners of the counter substrate 20 as shown in FIG. 1.

The inorganic alignment film 28 covering the pixel electrode 27 and the inorganic alignment layer 32 covering the counter electrode 31 are selected based on an optical design of the liquid crystal device 100. Examples of the inorganic alignment films 28 and 32 include an inorganic alignment film in which a film of an inorganic material such as silicon oxide (SiOx) is formed using a vapor growth method and substantially vertical aligned with respect to a liquid crystal molecule having negative dielectric anisotropy.

Such the liquid crystal device 100 is a transmission type and an optical design of a normally white mode in which the transmittance of the pixel P when a voltage is not applied is larger than the transmittance when a voltage is applied or a normally black mode in which the transmittance of the pixel P when a voltage is not applied is smaller than the transmittance when a voltage is applied, is employed. A polarization element is respectively arranged on an incident side and an exit side of light in accordance with an optical design of the liquid crystal device 100.

Configuration of Pixel Configuring Liquid Crystal Device

Figure 3:
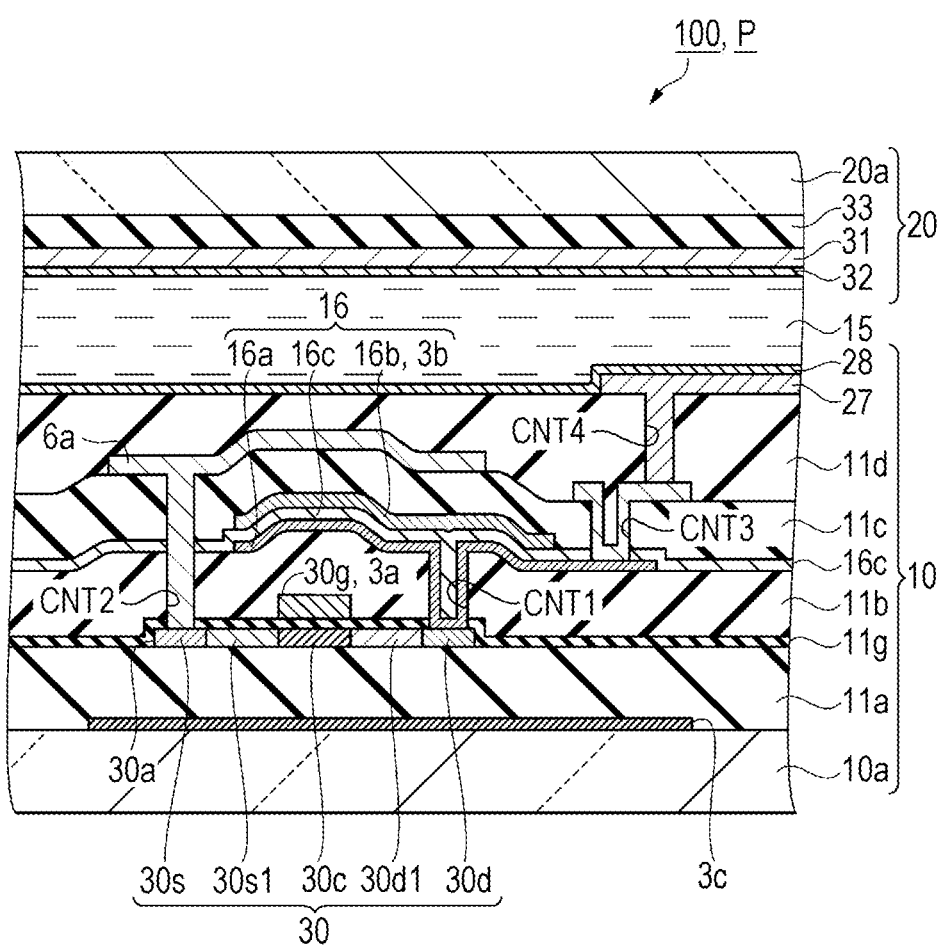
FIG. 3 is a schematic cross-section view mainly illustrating a structure of a pixel in the liquid crystal device.

FIG. 3 is a schematic cross-section view mainly illustrating a configuration of a pixel in the liquid crystal device. Hereinafter, a configuration of a pixel in the liquid crystal device will be described with reference to FIG. 3. Meanwhile, FIG. 3 illustrates a cross-sectional positional relation of each constituent element and is represented on a scale capable of specifying the positional relation.

As shown in FIG. 3, the liquid crystal device 100 includes the element substrate 10 and the counter substrate 20 arranged facing the element substrate 10. The first base material 10a configuring the element substrate 10 is configured with, for example, a quartz substrate or the like, as described above.

As shown in FIG. 3, a lower-side light shielding layer 3c including a material of, for example, Al (aluminum), Ti (titanium), Cr (chromium), W (tungsten), or the like is formed on the first base material 10a. The lower-side light shielding layer 3c is patterned planarly in a lattice shape and determines an opening region of each pixel P. Meanwhile, the lower-side light shielding layer 3c may have conductivity and may function as a part of a scanning line 3a. A base insulation layer 11a consisting of silicon oxide or the like is formed on the first base material 10a and the lower-side light shielding layer 3c.

The TFT 30, the scanning line 3a, and the like are formed on the base insulation layer 11a. The TFT 30 has, for example, a lightly doped drain (LDD) structure and has a semiconductor layer 30a consisting of polysilicon (high purity polycrystalline silicon) or the like, a gate insulation layer 11g which is formed on the semiconductor layer 30a, and a gate electrode 30g which is formed on the gate insulation layer 11g and consists of polysilicon film or the like. The scanning line 3a also functions as the gate electrode 30g.

The semiconductor layer 30a is formed as an N-type TFT 30, for example, by injecting N-type impurity ions such as phosphorus (P) ions. Specifically, the semiconductor layer 30a includes a channel region 30c, a data line side LDD region 30s1, a data line side source drain region 30s, a pixel electrode side LDD region 30d1, and a pixel electrode side source drain region 30d.

In the channel region 30c, P-type impurity ions such as boron (B) ions are doped. In other regions (30s1, 30s, 30d1, and 30d), N-type impurity ions such as phosphorus (P) ions are doped. In this manner, the TFT 30 is formed as an N-type TFT.

A first interlayer insulation layer 11b consisting of silicon oxide or the like is formed on the gate electrode 30g and the gate insulation layer 11g. A capacitance element 16 is provided on the first interlayer insulation layer 11b. Specifically, the capacitance element 16 is formed by arranging a first capacitance electrode 16a as a pixel potential side capacitance electrode which is electrically connected to the pixel electrode side source drain region 30d of the TFT 30 and the pixel electrode 27 facing a part of a capacitance line 3b (a second capacitance electrode 16b) as a fixed potential side capacitance electrode through a dielectric film 16c.

The dielectric film 16c is, for example, a silicon nitride film. The second capacitance electrode 16b (the capacitance line 3b) consists of, for example, a metal simple substance, an alloy, a metal silicide, a polysilicide, a laminated body thereof, or the like including at least one metal among metals having high melting point such as Ti (titanium), Cr (chromium), W (tungsten), Ta (tantalum), Mo (molybdenum), or the like. Alternatively, it is also possible to form the second capacitance electrode 16b from Al (aluminum) film.

The first capacitance electrode 16a consists of, for example, a conductive polysilicon film and functions as a pixel potential side capacitance electrode of the capacitance element 16. However, the first capacitance electrode 16a may be configured from a single-layer film or a multilayer film including a metal and an alloy in the same way as the capacitance line 3b. The first capacitance electrode 16a has a function of relaying and connecting the pixel electrode 27 and the pixel electrode side source drain region 30d (the drain region) of the TFT 30 through contact holes CNT1, CNT3, and CNT4, in addition to a function as a pixel potential side capacitance electrode.

A data line 6a is formed on the capacitance element 16 through a second interlayer insulation layer 11c. The data line 6a is electrically connected to the data line side source drain region 30s (the source region) of the semiconductor layer 30a through the gate insulation layer 11g, the first interlayer insulation layer 11b, the dielectric film 16c, and the contact hole CNT2 opened on the second interlayer insulation layer 11c.

The pixel electrode 27 is formed on an upper layer of the data line 6a through a third interlayer insulation layer 11d. The third interlayer insulation layer 11d consists of, for example, an oxide or a nitride of silicon and is subjected to a planarization treatment of planarizing a protrusion part on the surface generated by covering a region provided with the TFT 30. In methods of a planarization treatment, for example, a chemical mechanical polishing treatment (a CMP treatment), a spin coating treatment, and the like are included. The contact hole CNT4 is formed on the third interlayer insulation layer 11d.

The pixel electrode 27 is electrically connected to the pixel electrode side source drain region 30d (the drain region) of the semiconductor layer 30a by being connected to the first capacitance electrode 16a through the contact holes CNT4 and CNT3. Meanwhile, the pixel electrode 27 is formed from a transparent conductive film such as, for example, an ITO film.

The inorganic alignment film 28 on which an inorganic material such as silicon oxide ($SiO_2$) is obliquely vapor deposited, is provided on the pixel electrode 27 and the third interlayer insulation layer 11d between adjacent pixel electrodes 27. The liquid crystal layer 15 in which a space surrounded by the seal material 14 is filled with a liquid crystal or the like (refer to FIG. 1 and FIG. 2) is provided on the inorganic alignment film 28.

On the other hand, the insulation film 33 consisting of, for example, a PSG film (silicon oxide in which doping of phosphorus is performed) or the like is provided on the second base material 20a (the liquid crystal layer 15 side). The counter electrode 31 is provided over the entire surface of the insulation film 33. The inorganic alignment layer 32 on which an inorganic material such as silicon oxide ($SiO_2$) is obliquely vapor deposited, is provided on the counter electrode 31. The counter electrode 31 consists of a transparent conductive film such as, for example, an ITO film in the same way as the pixel electrode 27 described above.

The liquid crystal layer 15 assumes a predetermined alignment state by the inorganic alignment layers 28 and 32 in a state in which an electric field is not generated between the pixel electrode 27 and the counter electrode 31. The seal material 14 is an adhesive agent consisting of, for example, a photocurable resin or a thermosetting resin for sticking the element substrate 10 and the counter substrate 20 and spacers such as glass fiber or glass beads for setting a distance between the element substrate 10 and the counter substrate 20 to a prescribed value is mixed into the seal material 14.

Configuration of Liquid Crystal Device and Barrier Film

FIGS. 4A and 4B are schematic cross-section views illustrating a configuration of a barrier film provided in the liquid crystal device. FIG. 4A is a schematic cross-section view illustrating a configuration of the whole liquid crystal device. FIG. 4B is an enlarged cross-section view illustrating an A part of the liquid crystal device shown in FIG. 4A. Hereinafter, a configuration of a barrier film provided in the liquid crystal device is described with reference to FIGS. 4A and 4B.

As shown in FIGS. 4A and 4B, in the liquid crystal device 100, the element substrate 10 and the counter substrate 20 are stuck to each other through the seal material 14. A barrier film 41 is formed as an inorganic film over the side face 10b of the element substrate 10, the side face 14a of the seal material 14 and, furthermore, the side face 20b of the counter substrate 20.

The barrier film 41 is a film formed by an atomic layer deposition (ALD) technique. The ALD technique is a technique of sending a gaseous raw material to a film-formed face, forming a core from an area in which the gaseous raw material is attached on the film-formed face, and forming a film, in which a thin film which is very uniform and has high covering properties is formed. Specifically, the film can be formed in such a gap which is elongated and has high aspect ratio and it is possible to control a film thickness of nanometer and sub-nanometer.

As a material of the barrier film 41, for example, an inorganic metal element and an oxide film thereof can be used. Specifically, tantalum oxide ($Ta_2O_5$) is used and aluminum oxide ($Al_2O_3$), silica ($SiO_2$), hafnia ($HfO_2$) may be used. In addition, as other materials, a film including tantalum (Ta), oxygen (O), nitrogen (N), or carbon (C) may be used.

The seal material 14 is a film including a hydroxyl group (OH) and, for example, is an epoxy resin, a polyester, a polyether, a phenol resin, an acrylic resin, or the like. By using a material including a hydroxyl group, a gaseous raw material is selectively adsorbed to the seal material 14 and a reaction of an ALD proceeds.

The seal material 14 is arranged at a position (L) of 1 µm to 1,000 µm from the side faces 10b and 20b of the element substrate 10 and the counter substrate 20. The seal material 14 is desirably arranged at a position of 100 µm to 700 µm so that the barrier film 41 having high quality can be formed. The seal material 14 is further desirably arranged at a position of 200 µm to 500 µm.

A cell gap H (a length of an interval between the element substrate 10 and the counter substrate 20) is from 1 µm to 5

μm. The cell gap H is desirably from 2 μm to 3 μm so that the barrier film 41 having high quality can be formed.

The aspect ratio is from 1 to 500. The aspect ratio is desirably from 50 to 300 so that the barrier film 41 is neatly formed. The aspect ratio is further desirably from 100 to 200 so that the barrier film 41 having high quality is formed. When the aspect ratio becomes 500 or more, the barrier film 41 is hardly attached.

For example, the barrier film 41 is formed to have the thickness W in a range from 1 nm to 50 nm. The barrier film 41 is desirably formed with a thickness from 5 nm to 35 nm so that water (water vapor) hardly passes, a stress is hardly applied, and cracking hardly occurs. The thickness is further desirably from 10 nm to 30 nm. If the barrier film 41 is too thick, the fragileness thereof becomes high. Furthermore, since the stress difference between the substrate and the film is generated, there is a risk that the barrier film 41 is broken.

In a case where the film thickness W of the barrier film 41 is 1 nm or less, for example, the barrier properties deteriorate. On the other hand, in a case where the film thickness W of the barrier film 41 is 50 nm or more, the barrier film 41 is easily broken.

In this manner, since the barrier film 41 can be formed in the liquid crystal device 100 having the aspect ratio as described above, the barrier film 41 can be directly formed on the surface of each substrate 10 and 20 and the seal material 14 without being provided with the resin material or the like on the base of the barrier film 41. Therefore, it becomes possible to prevent the barrier film 41 from considerably protruding from the side faces 10b and 20b of each substrate 10 and 20 and an impact is hardly applied to the barrier film 41. In addition, since the side face 14a of the seal material 14 is covered with the barrier film 41, it is possible to prevent water from intruding into an area surrounded by the seal material 14, and thus it is possible to enhance the moisture resistance.

Figure 6:
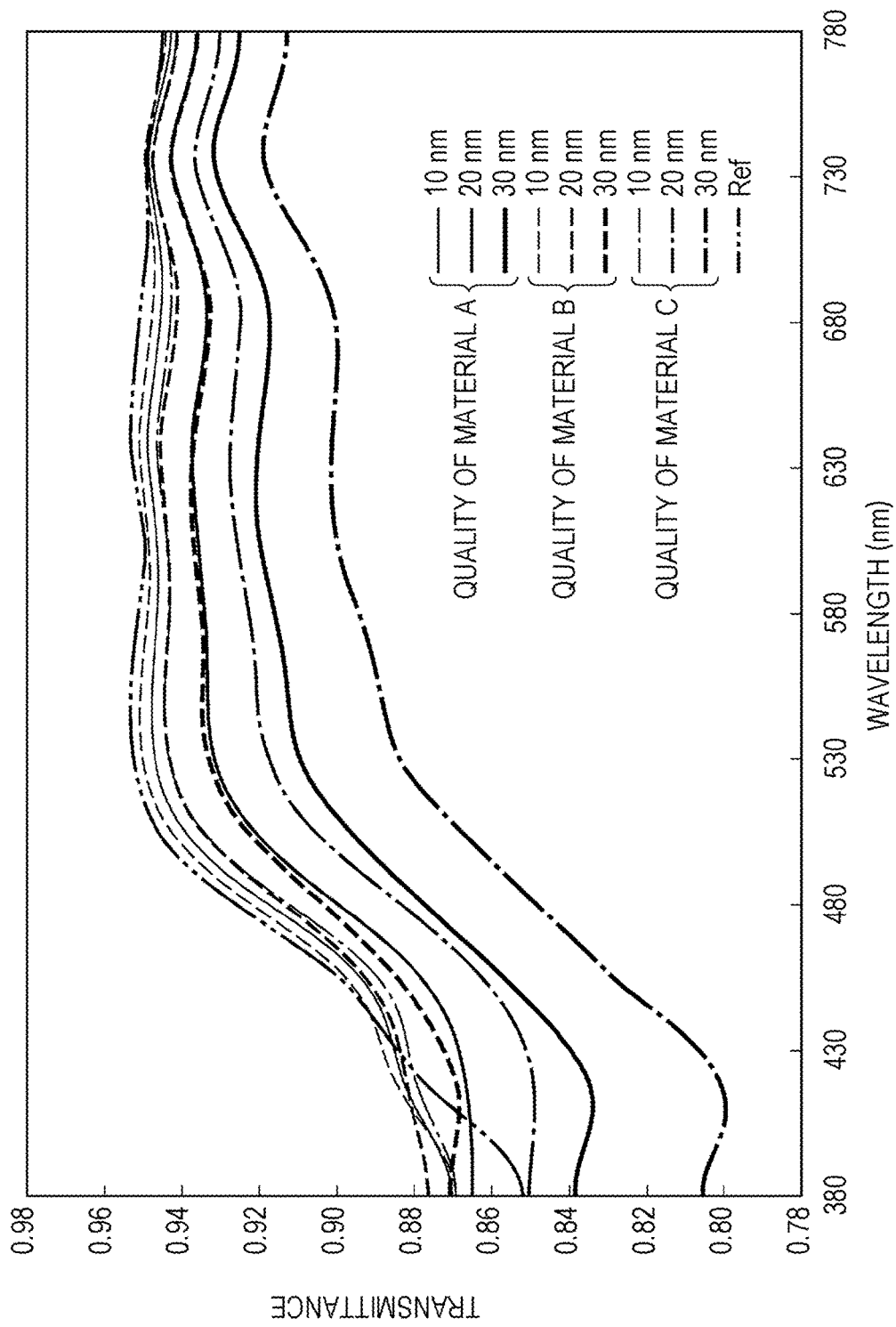
FIG. 6 is a graph illustrating a relationship between a wavelength and a transmittance measured while changing a quality of material and a film thickness.

FIG. 5 is a chart illustrating a relationship between an aspect ratio and the quantity of the occurrence of failures. FIG. 6 is a graph illustrating a relationship between a wavelength and a transmittance measured while changing a quality of material and a film thickness. Hereinafter, the aspect ratio between the element substrate and the counter substrate and the film thickness of the barrier film will be described with reference to FIG. 5 and FIG. 6.

The chart shown in FIG. 5 illustrates the quantity of the occurrence of failures of the liquid crystal device 100 measured while varying the aspect ratio which is a rate of a length H of an interval between the element substrate 10 and the counter substrate 20 to a length L from each of the side faces 10b and 20b of the element substrate 10 and the counter substrate 20 to the side face 14a of the seal material 14 in a stepwise fashion from 1 to 600.

Specifically, the barrier film 41 is formed in each liquid crystal device 100 in which the aspect ratio is set to 1, 10, 50, 150, 300, 500, or 600 and the number of failures generated after a moisture resistance test is conducted is indicated. Meanwhile, as to the number of samples used in a test, 5 samples were used with respect to each aspect ratio.

In a case where the aspect ratio was 1 or 10, the film of tantalum oxide which is a material of the barrier film 41, was formed, however, there were flaws on the film and the occurrence of failures was recognized. Meanwhile, in a case where the aspect ratio was 1, the number of failures was 4, and in a case where the aspect ratio was 10, the number of failures was 3, with respect to the sample number of 5.

In a case where the aspect ratio was 50, 150, or 300, the film of tantalum oxide was formed, there was no flaw on the film, and the occurrence of failures was not recognized.

In a case where the aspect ratio was 500 or 600, the film of tantalum oxide was not formed, the occurrence of failures was recognized. Specifically, the number of failures in a case where the aspect ratio was 500 was 4. In a case where the aspect ratio was 600, the number of failures was 5.

In the graph shown in FIG. 6, a horizontal axis indicates a wavelength (nm) and, specifically, indicates a wavelength in a range from 380 nm to 780 nm. In addition, a vertical axis indicates a transmittance and, specifically, indicates a transmittance in a range from 0.78 to 0.98.

Curves shown in the graph represent, the results in a case where the film thickness W of the barrier film 41 is thickened with respect to Ref and the barrier film is formed using three kinds of the quality of material A to the quality of material C. Specifically, for each quality of material, the transmittances in a case of setting the barrier films 41 to have thicknesses of 10 nm, 20 nm, and 30 nm, are shown.

In this manner, for all of quality of material A to quality of material C, it is understood that when the film thickness W is thickened, the transmittance decreases. In addition, in other words, by setting the barrier film 41 to have a thickness of 10 nm to 30 nm, it is possible to secure the transmittance from approximately 0.80 to 0.96.

Configuration of Electronic Apparatus

Figure 7:
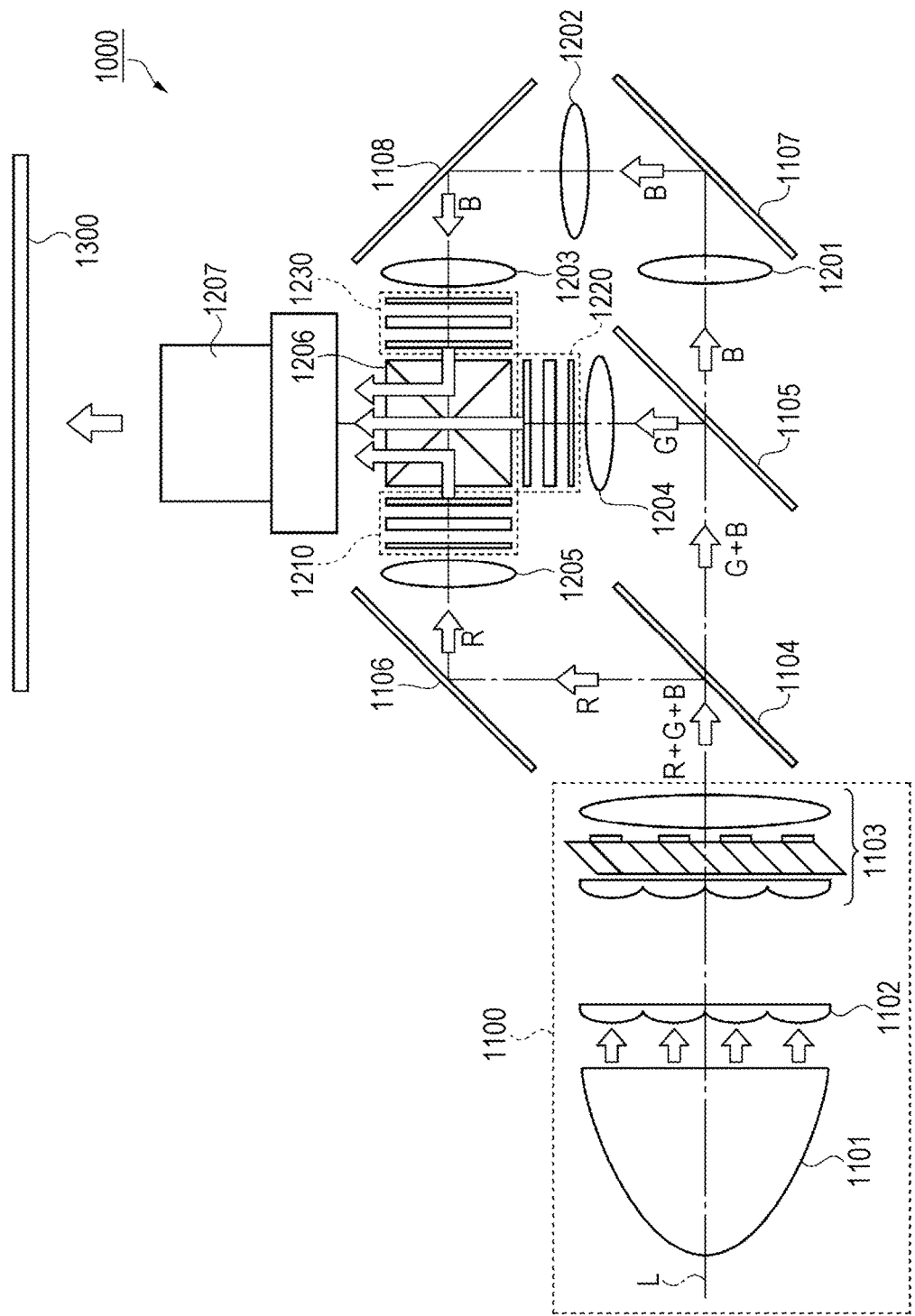
FIG. 7 is an outline view illustrating a configuration of a projector as an electronic apparatus.

Next, a projector as an electronic apparatus including the liquid crystal device described above will be described with reference to FIG. 7. FIG. 7 is an outline view illustrating a configuration of a projector.

As shown in FIG. 7, a projector 1000 in the embodiment includes a polarization lighting apparatus 1100 arranged along a system optical axis L, two dichroic mirrors 1104 and 1105 as a light separation element, three reflection mirrors 1106, 1107, and 1108, five relay lenses 1201, 1202, 1203, 1204, and 1205, three transmission type liquid crystal light valves 1210, 1220, and 1230 as an optical modulation means, a cross dichroic prism 1206 as an photosynthetic element, and a projection lens 1207.

The polarization lighting apparatus 1100 is schematically configured with a lamp unit 1101 as a light source consisting of a white light source such as an ultrahigh pressure mercury lamp or a halogen lamp, an integrator lens 1102, and a polarization conversion element 1103.

The dichroic mirror 1104 reflects red light (R) and transmits green light (G) and blue light (B) among polarized light fluxes emitted from the polarization lighting apparatus 1100. Another dichroic mirror 1105 reflects green light (G) and transmits blue light (B), which are transmitted through the dichroic mirror 1104.

After red light (R) reflected by the dichroic mirror 1104 is reflected by the reflection mirror 1106, red light (R) enters into the liquid crystal light valve 1210 via the relay lens 1205. Green light (R) reflected by the dichroic mirror 1105 enters into the liquid crystal light valve 1220 via the relay lens 1204. Blue light (B) transmitted through the dichroic mirror 1105 enters into the liquid crystal light valve 1230 via a light guide system consisting of three relay lenses 1201, 1202, and 1203 and two reflection mirrors 1107 and 1108.

The liquid crystal light valves 1210, 1220, and 1230 are respectively arranged facing incident surfaces for each color light of the cross dichroic prism 1206. The color light which enter into the liquid crystal light valves 1210, 1220, and 1230 is modulated based on video information (video signal) and emitted toward the cross dichroic prism 1206.

As to this prism, four right angle prisms are stuck and a dielectric multilayer film which reflects red light and a dielectric multilayer film which reflects blue light are formed in a cross shape on its inner surface. Three color lights are synthesized by these dielectric multilayer films and light representing a color image is synthesized. The synthesized light is projected onto a screen 1300 by a projection lens 1207 which is a projection optical system and an image is enlarged and displayed.

The liquid crystal device 100 described above is applied to the liquid crystal light valve 1210. The liquid crystal device 100 is arranged with a gap between a pair of polarization elements which are arranged in a crossed Nicol state on an incident side and an exit side of the color light. Other liquid crystal light valves 1220 and 1230 are the same as the liquid crystal light valve 1210.

Since the liquid crystal light valves 1210, 1220, and 1230 are used for such the projector 1000, it is possible to obtain high reliability.

Meanwhile, as an electronic apparatus on which the liquid crystal device 100 is mounted, there are various kinds of electronic apparatuses such as a head up display (HUD), a head mount display (HMD), a smartphone, an electrical view finder (EVF), a mobile mini projector, an electronic book, a mobile phone, a mobile computer, a digital camera, a digital video camera, a display, an onboard equipment, an audio equipment, an exposure apparatus, or a lightning equipment, in addition to the projector 1000.

Hereinbefore, as described in detail, according to the liquid crystal device 100 and the electronic apparatus of the embodiment, effects shown below are obtained.

(1) According to the liquid crystal device 100 of the embodiment, since an ALD technique is used, even in a case where the liquid crystal device 100 is configured having the aspect ratio as described above, the barrier film 41 can be formed over the seal material 14 and the side faces 10b and 20b of each substrate 10 and 20. Therefore, it is possible to directly form the barrier film 41 on the side faces of each substrate 10 and 20 and the seal material 14 without providing the resin material or the like on the base of the barrier film 41 unlike in the related art. Therefore, it becomes possible to prevent the barrier film 41 from considerably protruding from the side faces 10b and 20b of each substrate 10 and 20 and an impact is hardly applied to the barrier film 41. Furthermore, since the side face 14a of the seal material 14 is covered with the barrier film 41, it is possible to prevent water from intruding into an area surrounded by the seal material 14, and thus it is possible to enhance the moisture resistance.

(2) According to the electronic apparatus of the embodiment, since the electronic apparatus includes the liquid crystal device 100 as described above, it is possible to provide an electronic apparatus capable of enhancing a display quality.

Meanwhile, the aspects of the invention are not limited to the embodiments described above, can be appropriately changed within a range which is not contrary to the gist and the concept of the invention understood from the scope of claims and the whole specification, and are included in the technical scope of the aspects of the invention. In addition, the invention can be also carried out in forms as described below.

Modification Example 1

Figure 8:
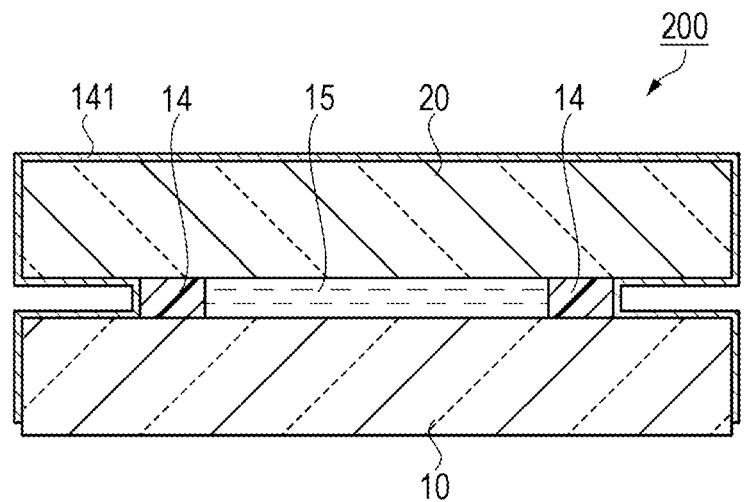
FIG. 8 is a schematic cross-section view illustrating a configuration of a liquid crystal device of a modification example.
Figure 9:
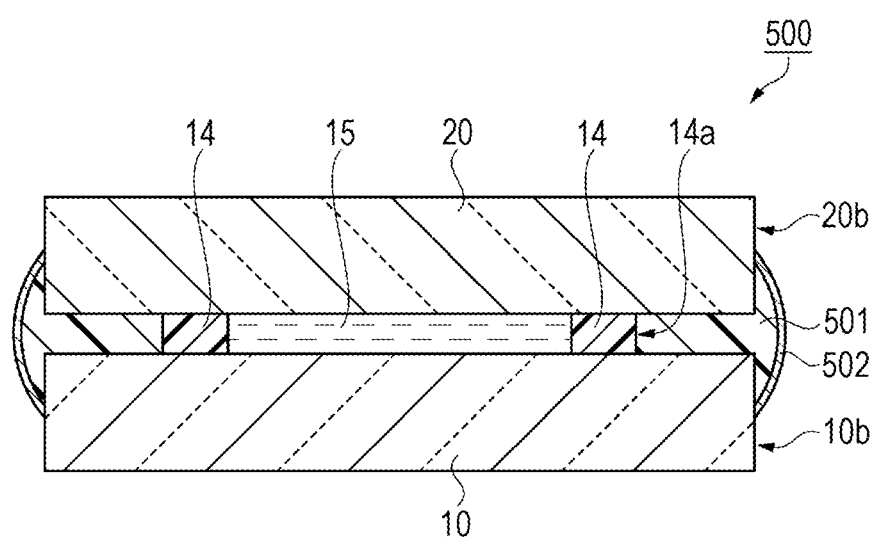
FIG. 9 is a schematic cross-section view illustrating a configuration of a liquid crystal device in the related art.

As described above, the liquid crystal device may be formed as shown in FIG. 8 without being limited to being provided with the barrier film 41 over the side face 14a of the seal material 14, the side face 20b of the counter substrate 20, and the side face 10b of the element substrate 10. FIG. 8 is a schematic cross-section view illustrating a structure of a liquid crystal device 200 of a modification example.

In the liquid crystal device 200 shown in FIG. 8, a barrier film 141 is also formed on an upper face of the counter substrate 20 (including the display region), in addition to the range of the barrier film 41 of the liquid crystal device 100 described above. As a quality of material of the barrier film 141, a film having transmissivity is desirable and, for example, silicon oxide ($SiO_2$) or aluminum oxide ($Al_2O_3$) is used.

Accordingly, since it is not necessary to peel the barrier film 141 formed on the upper face of the counter substrate 20, it is possible to simplify a manufacturing process. In addition, it also becomes unnecessary to prepare a mask in advance. Meanwhile, the barrier film 141 may be formed on a lower face of the element substrate 10 (including the display region) without being limited to the upper face of the counter substrate 20. In addition, the barrier film 141 may be formed on both the upper face of the counter substrate 20 and the lower face of the element substrate 10.

Modification Example 2

As described above, the film may be formed using, for example, a CVD method or the like without being limited to using an ALD technique when the barrier film 41 is formed in the liquid crystal device 100 in which the aspect ratio is large.

Modification Example 3

As described above, the electro-optical device may be applied to an organic EL apparatus without being limited to be applied to the liquid crystal device 100. Specifically, when the barrier film 41 is formed described above so as to cover a sealing resin, it is possible to enhance a moisture-proof function. In addition, the barrier film 41 may be formed without providing the sealing resin.

Modification Example 4

As described above, the electro-optical device may be applied to, for example, a plasma display, an electronic paper (EPD), or the like without being limited to be applied to the liquid crystal device 100.

What is claimed is:
1. An electro-optical device comprising:
a first substrate having a first surface;
a second substrate having a second surface facing the first surface of the first substrate;
an adhesive agent arranged between the first surface of the first substrate and the second surface of the second substrate for sticking the first surface of the first substrate and the second surface of the second substrate, the adhesive agent having a first face stuck to the first surface of the first substrate, a second face stuck to the second surface of the second substrate, and a third face arranged between the first face and the second face; and
an inorganic film provided so as to cover
the third face of the adhesive agent on one side of the electro-optical device, a region of the first surface of the first substrate between the first face of the adhesive agent and a side of the first substrate on the one side of the electro-optical device, and a region of the second surface of the second substrate between the second face of the adhesive agent and a side of the second substrate on the one side of the electro-optical device, wherein a distance between the first substrate and the second substrate, when viewed in cross-section, is less than:

a distance between the first face of the adhesive agent and the side of the first substrate on the one side of the electro-optical device, and a distance between the second face of the adhesive agent and the side of the second substrate on the one side of the electro-optical device.

2. The electro-optical device according to claim 1, wherein the inorganic film is a film formed by an atomic layer deposition ("ALD") technique.

3. The electro-optical device according to claim 1, wherein the inorganic film is formed of tantalum oxide.

4. The electro-optical device according to claim 1, wherein a thickness of the inorganic film is from 1 nm to 50 nm.

5. An electro-optical device comprising:
a first substrate having a first surface;
a second substrate having a second surface facing the first surface of the first substrate;
an adhesive agent arranged between the first surface of the first substrate and the second surface of the second substrate for sticking the first surface of the first substrate and the second surface of the second substrate, the adhesive agent having a first face stuck to the first surface of the first substrate, a second face stuck to the second surface of the second substrate, and a third face arranged between the first face and the second face; and
an inorganic film provided so as to cover
the third face of the adhesive agent on one side of the electro-optical device, a first region in the first surface of the first substrate between the first face of the adhesive agent and a side of the first substrate on the one side of the electro-optical device, and a second region in the second surface of the second substrate between the second face of the adhesive agent and a side of the second substrate on the one side of the electro-optical device, wherein a distance between the first substrate and the second substrate, when viewed in cross-section, is less than:

a length of the first region from the first face of the adhesive agent to the side of the first substrate on the one side of the electro-optical device, and a length of the second region from the second face of the adhesive agent to the side of the second substrate on the one side of the electro-optical device.

6. The electro-optical device according to claim 5, wherein the inorganic film is a film formed by an atomic layer deposition ("ALD") technique.

7. The electro-optical device according to claim 5, wherein the inorganic film is formed of tantalum oxide.

8. The electro-optical device according to claim 5, wherein a thickness of the inorganic film is from 1 nm to 50 nm.

9. An electronic apparatus comprising the electro-optical device according to claim 1.

10. An electronic apparatus comprising the electro-optical device according to claim 2.

11. An electronic apparatus comprising the electro-optical device according to claim 3.

12. An electronic apparatus comprising the electro-optical device according to claim 4.

13. An electronic apparatus comprising the electro-optical device according to claim 5.

14. An electronic apparatus comprising the electro-optical device according to claim 6.

15. An electronic apparatus comprising the electro-optical device according to claim 7.

16. An electronic apparatus comprising the electro-optical device according to claim 8.

* * * * *